United States Patent [19]
Misaizu et al.

[11] Patent Number: 5,150,383
[45] Date of Patent: Sep. 22, 1992

[54] ASYNCHRONOUS QUADRATURE DEMODULATOR

[75] Inventors: Kouei Misaizu, Kawasaki; Hiroshi Ohnishi, Tokyo, both of Japan

[73] Assignee: Matushita Electric Industrial Co., Ltd., Osaka, Japan

[21] Appl. No.: 665,857

[22] Filed: Mar. 7, 1991

[30] Foreign Application Priority Data

Mar. 8, 1990 [JP] Japan .................. 2-57184

[51] Int. Cl.⁵ .................................. H04L 27/06
[52] U.S. Cl. ............................ 375/94; 375/102; 329/304
[58] Field of Search ............... 375/39, 43, 50, 77, 375/86, 94, 102; 455/40, 202; 329/304

[56] References Cited

U.S. PATENT DOCUMENTS

| | | | |
|---|---|---|---|
| 4,253,186 | 2/1981 | Godard | 375/39 |
| 4,262,360 | 4/1981 | Bigo et al. | 375/50 |
| 4,796,279 | 1/1989 | Betts et al. | 375/39 |
| 5,022,053 | 6/1991 | Chung et al. | 375/39 |
| 5,029,186 | 7/1991 | Maseng et al. | 375/94 |

OTHER PUBLICATIONS

S. Sampei et al "Rayleigh Fading Compensation Method For 18 QAM In Digital Land Mobil & Radio Channels" 39th IEEE Vehicular Technology Conference, vol. II pp. 640-646 May 1989.

"Digital Microwave Communication", by M. Kuwabara and published by Kabishiki-kaisha Kikaku Centre in 1974.

*Primary Examiner*—Stephen Chin
*Attorney, Agent, or Firm*—Lowe, Price, LeBlanc & Becker

[57] ABSTRACT

An asynchronous quadrature demodulator which comprises an asynchronous quadrature detector, a frequency compensating circuit for estimating and compensating a frequency offset between an oscillating frequency of a local oscillator of the asynchronous quadrature detector and a frequency of a received carrier frequency on the basis of correcting signals, a base band complex equalizer for eliminating a transmission-channel distortion due to a multiplex transmission and a data demodulator. Thereby, a reference carrier recovery circuit becomes unnecessary. Thus, the structure of the demodulator can be simplified. Further, the demodulator can stably operate on the transmission channel.

5 Claims, 4 Drawing Sheets

ASYNCHRONOUS QUADRATURE DEMODULATOR

BACKGROUND OF THE INVENTION

1. Field of The Invention

This invention relates to an asynchronous quadrature demodulator for use in a high-speed private data transmission system, where a transmission-channel distortion, which mainly is due to a multiplex transmission using a multiplex transmission channel (hereunder sometimes referred to as a multi-path), is a dominant factor of degradation of data transmission characteristics, in an office, a building, a plant or the like or for use in a high-speed data transmission system which transmits data to or from a low-speed mobile station.

2. Description of The Related Art

With development of our society, a system capable of efficiently transmitting information as much as possible has become required in recent years. For instance, a M-ary quadrature amplitude modulation system (hereunder referred to simply as an MQAM system) can increase a quantity of transmitted information without widening transmission frequency bandwidth, and is therefore effective in making good use of frequency. Thus, conventionally, the MQAM system is employed mainly in a fixed microwave communication circuit. An example of such an MQAM system is disclosed in a work entitled Digital Microwave Communication (written by M. Kuwabara and published by Kabushiki-kaisha Kikaku Centre in 1974).

FIG. 5 illustrates the construction of a conventional demodulator of a quadrature synchronization detection type employed in an MQAM system.

Hereinafter, a conventional demodulator will be described by referring to FIG. 5. In FIG. 5, reference numeral 51 denotes a quadrature detector; 52 a reference carrier recovery circuit; and 53 a data demodulator.

As illustrated in FIG. 5, a received signal 50 is supplied through a branching point to two phase detectors which detect the received signal in synchronization with each other by respectively using two reference carriers different in phase from each other by 90 degrees. Thereafter, an I-axis output (i.e., an I-signal) 54 and an Q-axis output (i.e., a Q-signal) 55 outputted from the detector 51 as a result of the synchronous detection are inputted to the data demodulator 53 in which the inputted I and Q signals are discriminated from each other and then original modulating signals respectively corresponding thereto are recovered therefrom.

Referring now to FIG. 6, there is shown an example of the reference carrier recovery circuit 52 for issuing the reference carriers to both of the phase detector and a phase shifter of FIG. 5. The reference carrier recovery circuit of FIG. 6 is what is called a selective control type carrier synchronization circuit for use in a 16-ary quadrature amplitude modulation system (hereunder referred to simply as a 16-QAM system). As is seen from FIG. 6, this reference carrier recovery circuit selects a signal having a phase component corresponding to 4-level phase shift keying signal (hereunder referred to as a 4-level PSK signal) from a 16-QAM wave by using a signal demodulated and recovered. Thus, a phase-locked loop using only this signal is formed.

It is known to those skilled in the art that the construction of such a reference carrier recovery circuit employed in an MQAM system becomes rather complex as the example of FIG. 6 is.

Incidentally, in case of a private data transmission system used in an office, a building or the like, a portable small-sized demodulator is needed. The above described demodulator of the quadrature synchronization detection type, however, requires a reference carrier recovery circuit and thus has a complex structure. Therefore, the conventional demodulator has a drawback that it is not suitable for miniaturizing. The present invention is created to eliminate the above-mentioned drawback of the conventional demodulator.

It is accordingly an object of the present invention to provide a small-sized demodulator which has a simple structure and does not require a reference carrier recovery circuit. Further, it is another object of the present invention to provide an asynchronous quadrature demodulator which can stably operate in a transmission channel having a transmission-channel distortion due to a multiplex channel.

SUMMARY OF THE INVENTION

To achieve the foregoing object and in accordance with the present invention, there is provided an asynchronous quadrature demodulator which comprises an asynchronous quadrature detector, a frequency compensating device for performing a frequency compensation by estimating a frequency offset between an oscillating frequency of a local oscillator of the asynchronous quadrature detector and a frequency of a received carrier on the basis of first and second frequency correcting symbols included in a transmitted signal and used for effecting a frequency compensation, thereby making a reference carrier recovery circuit unnecessary. The asynchronous quadrature demodulator further comprises a base band complex equalizer for eliminating a transmission-channel distortion, which is caused due to a multi-path, from a signal of which a frequency compensation is performed by the frequency compensating device.

In the demodulation of the present invention having the above described construction, a received signal which is subjected to an effect of a transmission-channel distortion due to a multi-path, is detected by the asynchronous quadrature detector. Then, a phase of the output of the detector is compensated by the frequency compensating device by estimating a frequency offset between an oscillating frequency of a local oscillator of the asynchronous quadrature detector and a frequency of a received carrier on the basis of the first and second frequency compensation symbols included in an output of the detector. Further, the transmission-channel distortion is removed from the output, of which the phase is corrected, of the detector by the base band complex equalizer. Thus, the present invention provides a demodulator having a simple structure which can stably operate on a transmission channel, on which a transmission-channel distortion due to the multi-path is present. It follows that a reference carrier recovery circuit becomes unnecessary. Consequently, the present invention is very advantageous to miniaturization of a demodulator and to stabilization of characteristics of a demodulator.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which.

DETAILED DESCRIPTION OF THE PREFERRED EMBODIMENT

Figure 1:
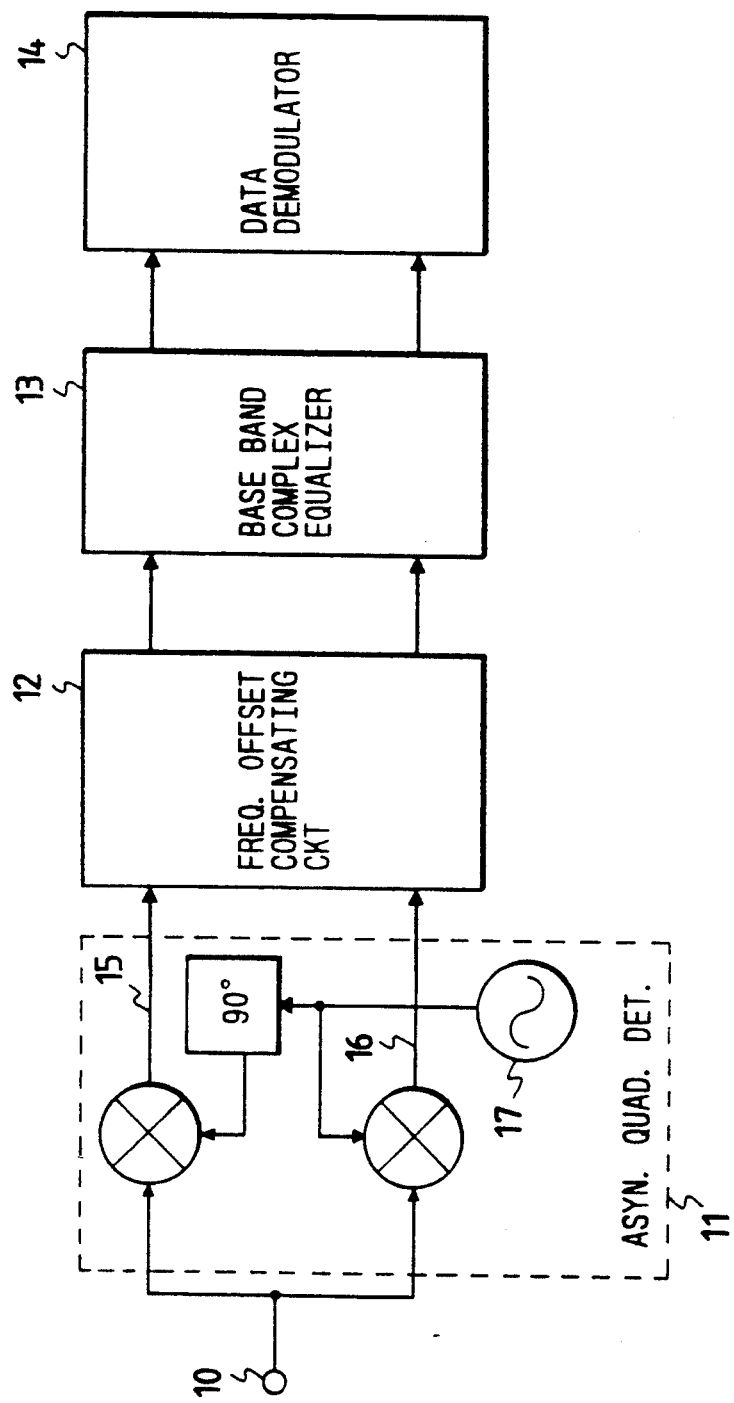
FIG. 1 is a schematic block diagram for showing the construction of an asynchronous quadrature demodulator embodying the present invention.

Hereinafter, a preferred embodiment of the present invention will be described in detail by referring to FIG. 1 which shows an asynchronous quadrature demodulator embodying the present invention. In FIG. 1, reference numeral 11 designates an asynchronous quadrature detector; 12 a frequency offset compensating device; 13 a base band complex equalizer; and 14 a data demodulator.

Hereunder, an operation of the demodulator constructed as shown in FIG. 1 employing a 16-QAM method will be described. First, a received signal 10 is fed through a branching point to two phase detectors of the asynchronous quadrature detector 11 wherein the received signal is detected. Thereafter, the frequency offset compensating device 12 estimates from outputs 15 and 16 of the phase detectors (namely, an I-signal 15 and a Q-signal 16) a frequency offset between a frequency of a received carrier and an oscillating frequency of a local oscillator 17 of the asynchronous quadrature detector 11 and compensates the frequency offset. Then, in the received signal, of which the frequency offset is compensated, a transmission channel distortion due to the multi-path (hereunder sometimes referred to simply as a multi-path distortion) is equalized by using the base band equalizer 13. Further, an original modulating signal representing data is demodulated by the data demodulator 14 by discriminating and recovering the data.

Figure 2A:
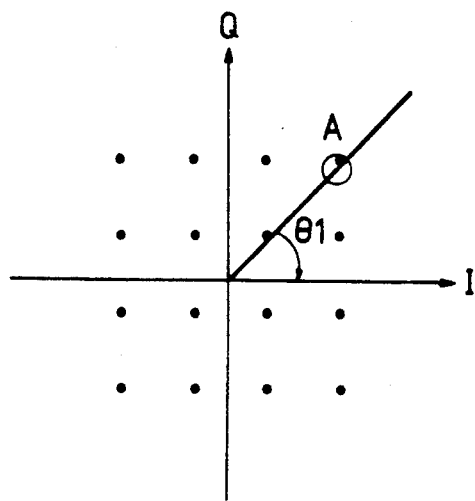
FIG. 2(a) is a diagram for illustrating a distribution of 16 signals obtained in a 16-QAM system on an I-Q plane.
Figure 3:
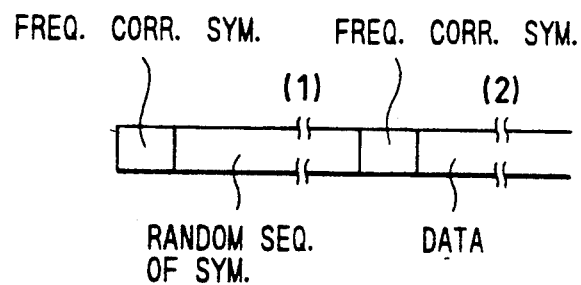
FIG. 3 is a schematic representation of a frame format of a transmitted signal in case of the demodulator of FIG. 1.

Next, an operation of the frequency compensating device (hereunder referred to as a frequency compensating operation) will be described hereinbelow. First, a frame format of a transmitted signal is made up of first frequency correcting symbols (1), a random sequence of from scores to hundreds symbols, second frequency correcting symbols (2) and data, as shown in FIG. 3. The frequency correcting symbols (1) and (2) are ten or twenty symbols succeeding a symbol corresponding to a point A on a I-Q plane of FIG. 2(a), which shows a distribution of signals obtained in a 16-QAM system. Incidentally, the point A corresponds to a signal having a maximum amplitude among the signals of the distribution illustrated in FIG. 2(a).

Figure 2B:
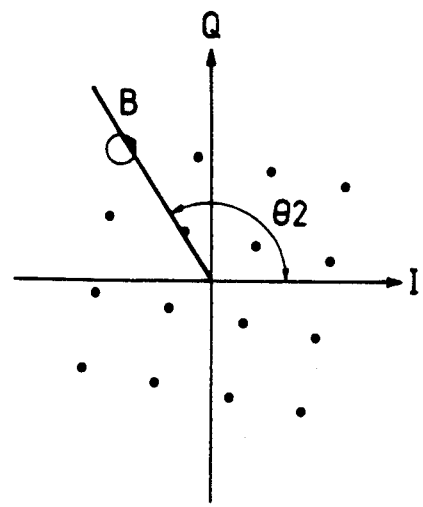
FIG. 2(b) is a diagram for illustrating a change in phase of a symbol of which a frequency correction is made at the time of performing an asynchronous quadrature detection.

Here, it is supposed that the transmitted signal having the frame format of FIG. 3 is transmitted through a transmitting channel having the multi-path distortion and is then received by this embodiment and detected by the asynchronous quadrature detector which performs an asynchronous quadrature detection. Usually, an output signal of the asynchronous quadrature detector having a phase changed due to the multi-path distortion and to the frequency offset between an oscillating frequency of a local oscillator and a frequency of a carrier received by the asynchronous detector cannot uniquely be correspondent to a point on the I-Q plane. However, regarding a pair of symbols, which are separated by successive symbols of the number corresponding to a time equal to or more than a maximum delay time of the multi-path from each other, of the frequency correcting symbols of FIG. 3, each symbol of the pair is the same as symbols adjacent thereto and therefore, there is substantially no influence of the multi-path distortion on a change in phase of an output of the asynchronous quadrature detector. Hence, only influence of a frequency offset of the asynchronous quadrature detector on a change in phase of an output of the detector is taken into consideration. For instance, providing that among the frequency correcting symbols, a given symbol (hereunder referred to as a first symbol) is detected as correspondent to the point A of FIG. 2(a), and then an Nth symbol from the first symbol is detected as a point B of FIG. 2(b), an amount $\phi$ of a compensation for change in phase of the output of the detector per symbol is obtained by the following equation:

$$\phi = (\theta_2 - \theta_1)/N.$$

Figure 4:
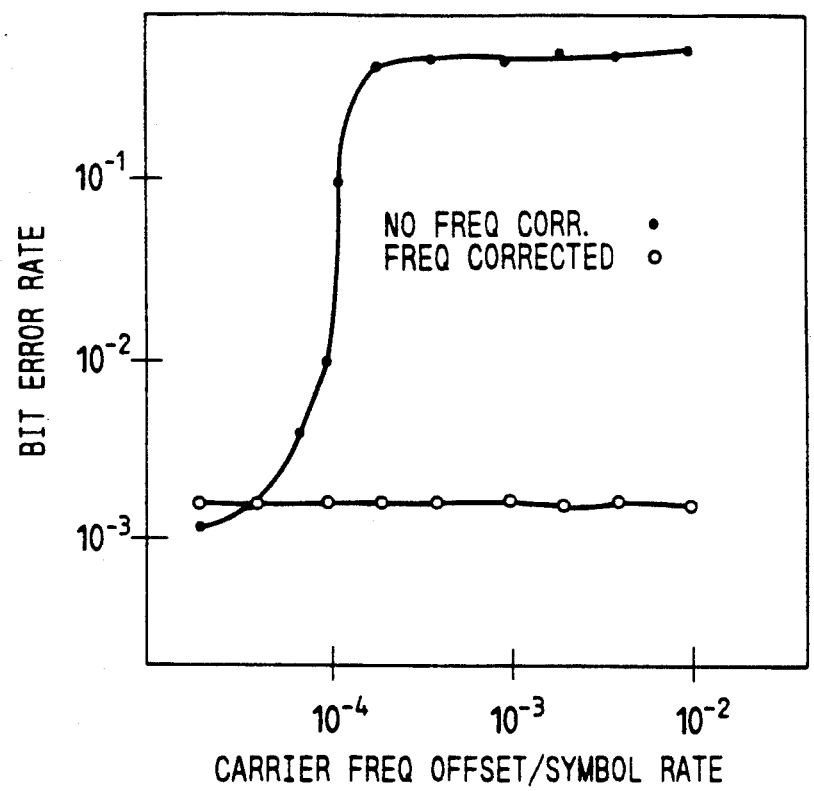
FIG. 4 is a graph for illustrating a relation between a bit error rate and a frequency offset in case of the demodulator of FIG. 1.
Figure 5:
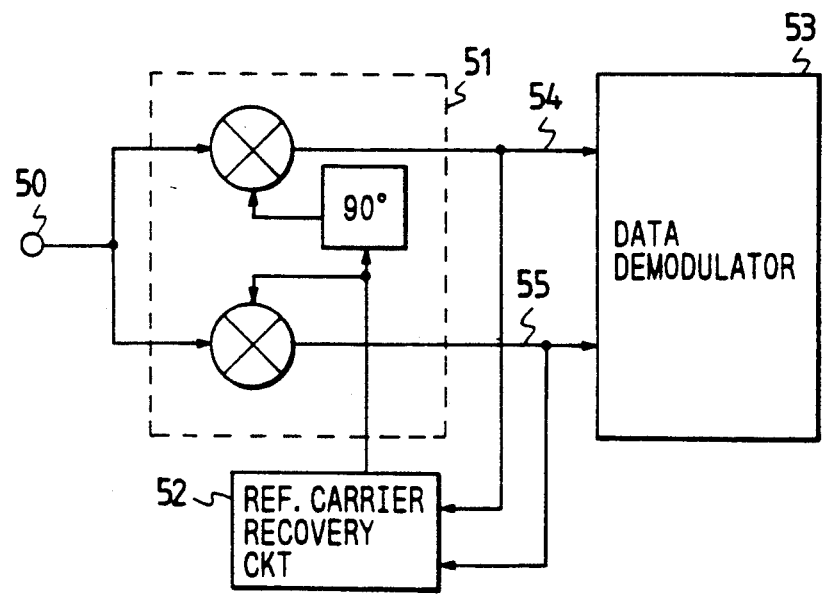
FIG. 5 is a schematic block diagram for showing the construction of a conventional demodulator.
Figure 6:
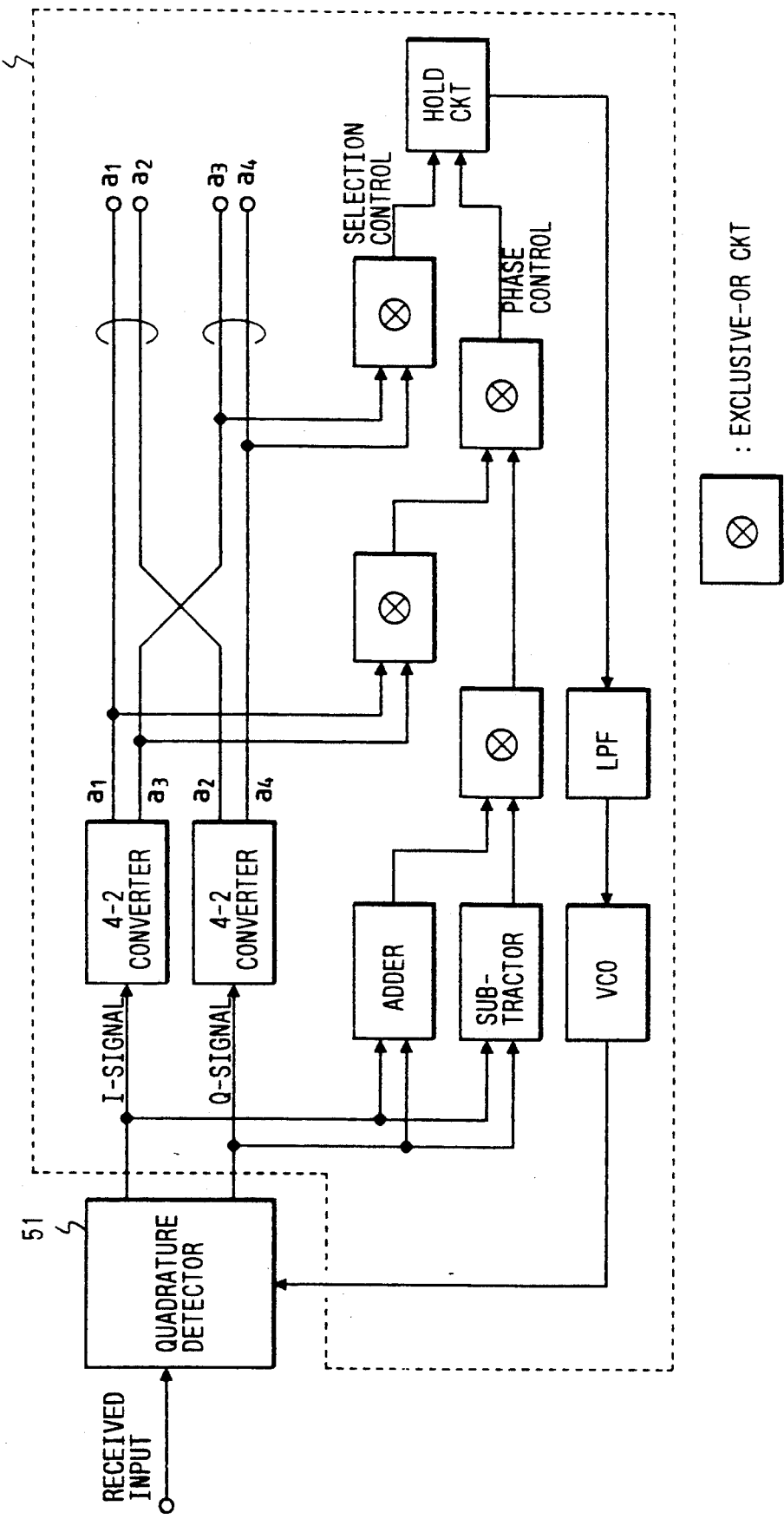
FIG. 6 is a schematic block diagram for illustrating the construction of a reference carrier recovery circuit of the conventional demodulator of FIG. 5.

Thus, the frequency compensating operation is performed by effecting the following two stages. Namely, a coarse compensation for a carrier frequency offset is effected by using several of the first frequency correcting symbols (1). Subsequently, a fine compensation for a carrier frequency offset is performed by using several of the second frequency correcting symbols (2) which are apart from the first frequency correcting symbols (1) by tens or hundreds symbols. FIG. 4 is a graph for illustrating examples of a relation between a bit error rate and a carrier frequency offset in a case where the above-mentioned compensation for the carrier frequency offset (hereunder referred to as the carrier frequency offset compensation) is performed and in another case where not performed. In FIG. 4, white circles indicate the relation between a bit error rate and a carrier frequency offset in the former case; and black circles the relation between a bit error rate and a carrier frequency offset in the latter case. As is understood from FIG. 4, even in case where a carrier frequency offset is approximately one-hundredth of a symbol rate, a preferable bit error-rate-to-carrier-frequency-offset characteristic can be achieved by the asynchronous quadrature detection system of the present invention, namely, by performing the above described carrier frequency offset compensation.

As is apparent form the foregoing description, a demodulator having a simple structure and employing an asynchronous quadrature detection method can be provided by estimating a frequency offset between an oscillating frequency of a local oscillator of the asynchronous quadrature detector and a frequency of a received carrier and performing a frequency correction. Further, such a demodulator can stably operate on a transmission channel, on which a transmission-channel distortion due to the multi-path is present, by equalizing the transmission channel distortion, which is present in an output of the detector corrected by effecting a frequency correction, by using a base band complex equalizer.

While a preferred embodiment of the present invention has been described above, it is to be understood that the present invention is not limited thereto and that other modifications will be apparent to those skilled in the art without departing from the spirit of the invention. For example, in the above described embodiment, the 16-QAM is employed as a modulation method. Other modulation methods, however, may be employed in the demodulator of the present invention. The scope of the present invention, therefore, is to be determined solely by the appended claims.

What is claimed is:

1. An asynchronous quadrature demodulator comprising:
   an asynchronous quadrature detector means having a local oscillator means for receiving and detecting a carrier and for outputting signals;
   a frequency compensating circuit means for receiving the signals outputted from said asynchronous quadrature detector means, for estimating and compensating a frequency offset between an oscillating frequency of said local oscillator means and a frequency of a received carrier on the basis of frequency correcting signals included in the received carrier and for outputting a signal representing a result of the compensation of the frequency offset;
   a base band complex equalizer means for receiving the signal outputted from said frequency compensating circuit means, for eliminating a transmission-channel distortion due to a multiplex transmission from the signal received from said frequency compensating circuit means and for outputting a signal indicating a result of the elimination of the transmission-channel distortion; and
   a data demodulator means for receiving the signal outputted from said base band complex equalizer and for demodulating data from the signal received from said base band complex equalizer means.

2. An asynchronous quadrature demodulator as set forth in claim 1, wherein the frequency correcting signals includes first and second frequency correcting symbol signals.

3. An asynchronous quadrature demodulator as set forth in claim 2, wherein among the first and second frequency correcting symbol signals, signals used for estimating the frequency offset are separated from each other by a time corresponding to a predetermined number of correcting symbol signals.

4. An asynchronous quadrature demodulator as set forth in claim 1, wherein said asynchronous quadrature detector means further comprises;
   a phase shifter means connected to said local oscillator means for receiving an output signal of said local oscillator means, for shifting a phase of the output signal of said local oscillator means by a predetermined quantity and for outputting a first signal having a shifted phase;
   a first phase detector means connected to said phase shifter means for receiving the carrier and the first signal outputted from said phase shifter means, for detecting the carrier by using the first signal as a reference signal and for outputting a second signal representing a result of the detection of the carrier;
   a second phase detector means connected to said local oscillator means for receiving the carrier and an output signal of said local oscillator means, for detecting the carrier by using the received output signal as a reference signal and for outputting a third signal representing a result of the detection of the carrier.

5. An asynchronous quadrature demodulator as set forth in claim 4, wherein the second and third signals are an I-signal and a Q-signal, respectively.

* * * * *